C. STEFFEN.
APPARATUS FOR CONTINUOUSLY LIXIVIATING PLANTS.
APPLICATION FILED MAY 24, 1905.
1,006,311.
Patented Oct. 17, 1911.
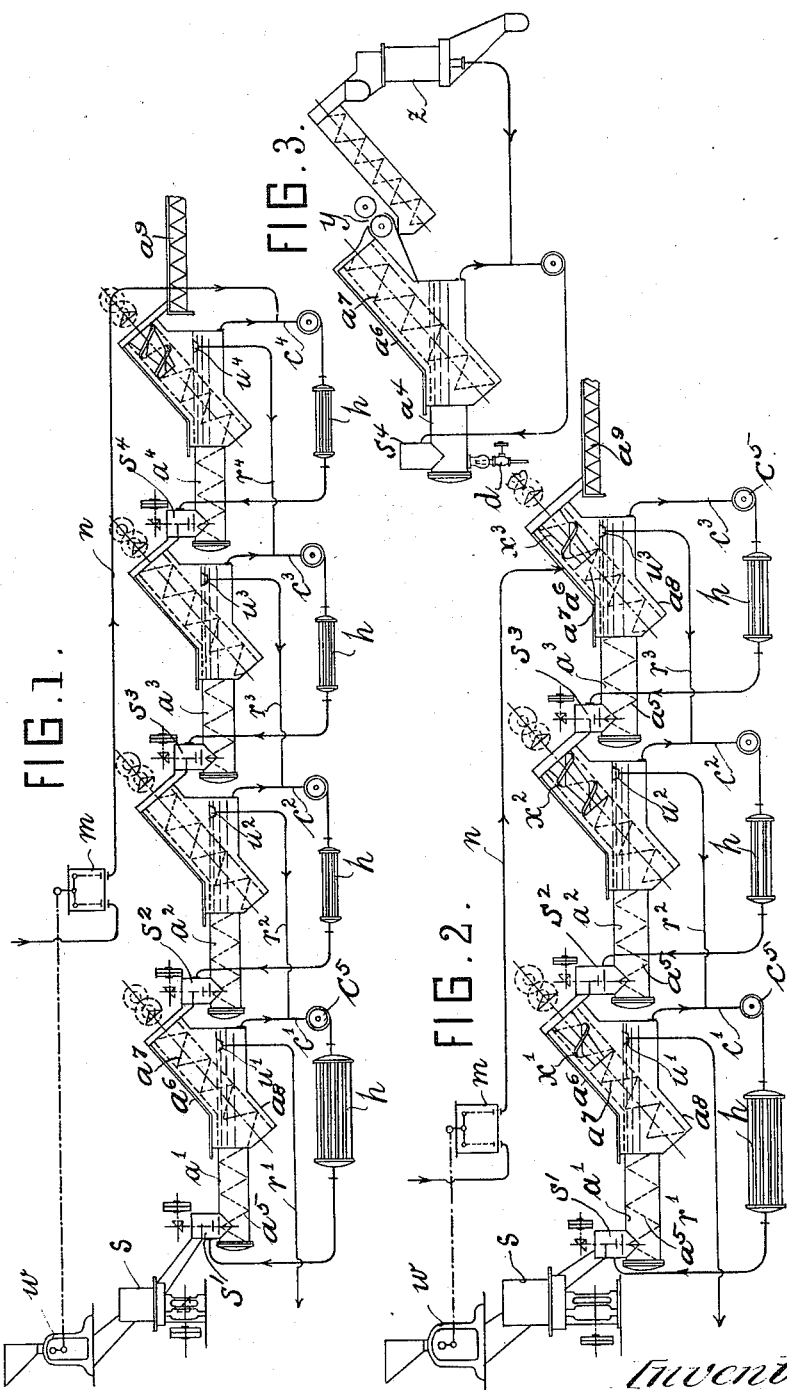

UNITED STATES PATENT OFFICE.

CARL STEFFEN, OF VIENNA, AUSTRIA-HUNGARY.

APPARATUS FOR CONTINUOUSLY LIXIVIATING PLANTS.

1,006,311. Specification of Letters Patent. Patented Oct. 17, 1911.

Application filed May 24, 1905. Serial No. 262,078.

*To all whom it may concern:*

Be it known that I, CARL STEFFEN, a subject of the Emperor of Austria-Hungary, and resident of No. 40 Heugasse, Vienna, in the Empire of Austria-Hungary, engineer, have invented a certain new and useful Improved Apparatus for Continuously Lixiviating Plants, of which the following is a clear, full, and exact description.

This invention relates to a lixiviating apparatus for subjecting plants and other substances to a continuous lixiviating operation, and the parts thereof are divided into separate vessels arranged to hold quantities of liquid having different degrees of concentration, the plants or solid matter to be lixiviated being passed successively through the said quantities of liquid.

Specifically the apparatus comprises a set of vessels or compartments in which the quantities of liquid are contained, each compartment being provided with a circulating system whereby the liquid is caused to constantly circulate when passing through one compartment from one end of the same to the other. Primarily the liquid is in materially greater proportion relatively to the solid matter treated when the said liquid and solid matter enter at one end of the vessel, and by this means an easily movable or freely circulating mixture is produced. At the outlet end of each vessel or compartment a device is provided for separating the solid from the liquid matter and also means for conveying the solid matter from the lixiviating liquid and delivering said solid matter to the supply end of the next compartment or vessel. Connected to the last vessel or compartment of the system is a supply pipe for the addition of unused liquid, and, furthermore, between the vessels or compartments intermediate pipes are provided for conducting the surplus liquid successively forward to the several vessels or compartments and thus cause the liquid to flow from the last vessel to the next preceding one, and so on through all the vessels.

A still further feature of construction is to provide the vessels at different levels with overflow means to enable the liquid to be supplied from the highest level of the last vessel to the next preceding vessel, and so on through the series of vessels.

The invention also comprises other features of construction and arrangement which will be more fully hereinafter specified.

In the drawing: Figure 1 is a diagrammatic view of the apparatus embodying the features of the invention. Fig. 2 is a similar view showing a modification. Fig. 3 is a similar view of a portion of the apparatus showing a further modification.

Referring to Fig. 1, $a'$, $a^2$, $a^3$ and $a^4$ designate the vessels or compartments through which the plants or solid matter to be lixiviated is successively passed and when it reaches the last vessel it is completely treated in accordance with the operation desired. Each vessel or compartment is provided with a circulating pipe as at $c'$, $c^2$, $c^3$ and $c^4$, each of the pipes having the opposite ends respectively connected to the lower rear portion of the vessel or compartment and the inlet of the latter. Each pipe $c'$, $c^2$, $c^3$, $c^4$ has a heating device $h$ of suitable construction intermediately introduced therein, and between the heating device and the rear extremity of the vessel or compartment to which one end of the pipe is attached a pump $c^5$ is also introduced in the pipe, each pipe, heating device, and pump constituting the main circulating system for the individual vessels or compartments. Operatively associated with the first vessel or compartment $a'$ is a dumping scale $w$ which receives the solid matter or plants to be lixiviated and is connected to a slicer $s$ which in turn deposits its contents in a feeder $s'$ at the forward extremity of the first vessel or compartment $a'$, the front end of the pipe $c'$ connecting with this feeder. Each of the succeeding vessels or compartments is provided with a feeder similar to that used with the first vessel or compartment and these successive feeders are all respectively represented by the characters $s^2$, $s^3$ and $s^4$. The several feeders $s'$, $s^2$, $s^3$ and $s^4$ are of suitable construction adapted for the purpose and operate to positively force or dispose the solid matter or material to be treated in the forward extremities of the several vessels or compartments. It will be understood that the dumping scale is used to weigh the solid matter or material to be treated and which may be beet-roots, cane, and analogous substances; and from the dumping scale the said solid matter or material passes to the slicer $s$ where it is cut in slices and preferably delivered in this form to the feeder $s'$. Each vessel or compartment also has a longitudinal conveyer $a^5$ therein leading to an elevator or transferring means $a^6$ likewise having a conveyer $a^7$ therein, a depression or well as $a^8$ being formed in the bottom of each vessel at a point adjacent to the rear extremity of the conveyer $a^5$ and the forward extremity of the conveyer $a^7$. These conveyers are driven by suitable mechanism actuated from a source of power and each vessel or compartment is similarly equipped, the upper extremity of each elevator or transferring means delivering the solid matter or material treated from each vessel or compartment to the successive feeders, the last elevator or transferring means delivering the solid matter or material treated after final lixiviation into suitable conveying means as at $a^9$ by which it may be carried to a point distant from the apparatus. In the rear extremity of each vessel or compartment $a'$, $a^2$, $a^3$, $a^4$ is an overflow, the several overflows being respectively designated by the characters $u'$, $u^2$, $u^3$ and $u^4$ and having pipes $r'$, $r^2$, $r^3$, and $r^4$ connected thereto and first extending downwardly and through the bottoms of the vessels or compartments and then horizontally, the return pipes $r^2$, $r^3$ and $r^4$ being connected to the pipes $c'$, $c^2$ and $c^3$ above the pumps $c^5$. The pipe $r'$ serves as a discharge for the liquid richest in sugar and obtained by lixiviation. Through the medium of the overflows $u'$, $u^2$, $u^3$, $u^4$ and the return pipes $r'$, $r^2$, $r^3$, $r^4$ the liquid in the several vessels or compartments is caused to be discharged in its richest state from the first vessel and in a state of less richness from the succeeding vessels to the successive preceding vessels so that the liquid from a vessel or compartment of medium richness, for instance, is conveyed to a preceding vessel having liquid of a stronger saccharine richness and materially affected by the stronger liquid, and thus through the whole series of vessels a liquid of approximate equality of richness is produced and has circulation.

It will be understood that the final vessel or compartment contains the poorest liquid, and to compensate for this depreciation of the liquid in the last vessel an additional liquid is supplied by means of a pipe $n$ running from a containing cistern or supply medium $m$ which may be operatively connected to the dumping scale $w$ and filled with the proper liquid from any suitable point. The pipe $n$ connects with the pipe $c^4$ above the pump $c^5$ of the latter pipe.

The structure disclosed by Fig. 2 is practically identical with that shown by Fig. 1 with the exception that in the elevators or transferring devices $a^6$ pressing cones $x'$, $x^2$ and $x^3$ are introduced and coöperate with the conveyers $a^7$ so that an extraction of juice takes place each time the solid matter is transferred from one vessel to the other. The expressed juice obtained by pressing the partly lixiviated plants, that is, in consequence of the pressure taking place during the transit of the plants or solid matter treated from one lixiviating vessel to the other, may also be conveyed into the vessel in which the plants or matter were disposed before being pressed, or into that vessel in which they pass after being pressed.

Fig. 3 shows supplementary mechanism added to the apparatus and consists in a pressing device $y$ at the upper terminal of the elevator or transferring mechanism, the said pressing device embodying a pair of crushing rolls from which the juice flows back to the vessel. This modification also embodies a further pressing means as $z$, preferably a hydraulic press for pressing the beet root slices or other solid matter after final delivery of the latter or subsequent to the last lixiviating operation.

The additional liquid from the cistern $m$ and fed to the last vessel is preferably added to the expressed solid matter before being pressed a second time or intermixed in the conveyer or feed screw, as shown by Fig. 2, and wherein the pipe $n$ connects with the final elevator or transferring mechanism. Aside from the particular additions to the apparatus as specified in connection with Fig. 3, the apparatus as disclosed by this figure will be in the remaining features of construction precisely similar to the apparatus disclosed by Fig. 1 or Fig. 2.

As hereinbefore described, the liquid of each separate vessel always flows back into the vessel preceding and richer in sugar and the lixiviated juice thus formed flows through the entire lixiviating apparatus, including all of the vessels. As illustrated, a suitable apparatus for lixiviating saccharine plants may be formed of four vessels, the circulating juice of each vessel representing about four times the weight of the plants or material fed to the vessel in the shortest space of time, so that the mixture formed in the vessel contains about four parts liquid and one part vegetable matter. It has been found advantageous in carrying out the operation that the lixiviation should ensue at temperatures between 80° and 100° C. In Figs. 1 and 2 the heating devices $h$ are shown disposed in the pipes $c'$, $c^2$, $c^3$ and $c^4$; in Fig. 3 the heating device $d$ is connected to the front extremity of the vessel.

From the foregoing description the operation of continuous lixiviation will be readily understood.

The plants or material to be treated are first deposited in the vessel or receptacle $a'$ in combination with a certain proportion of liquid and the supply of liquid throughout the series of vessels is maintained until the quantity of solid matter treated has been thoroughly lixiviated. The solid matter is transferred from one vessel or compartment to the next through the medium of the elevators, and the liquid richest in sugar is discharged from the upper rear portion of the first vessel $a'$ by the pipe $r'$ and from the same point of the second vessel $a^2$ by the pipe $r^2$ to the circulating pipe $c'$ of the first vessel, and from the third vessel $a^3$ from the same point by a pipe $r^3$ to the pipe $c^2$ of the second vessel $a^2$, and from the same point of the fourth vessel $a^4$ by the pipe $r^4$ to the pipe $c^3$ of the third vessel $a^3$. The liquid passing out from the several vessels $a'$, $a^2$, $a^3$, $a^4$ through the respective pipes $c'$, $c^2$, $c^3$ and $c^4$ is pumped back to the feeders $s'$ through the heaters $h$ and by maintaining a certain temperature or degree of heat as hereinbefore noted, the lixiviating operation may be rapidly carried on and at the same time the liquid varying in sugar richness in the several vessels may be practically rendered uniform in richness. The liquid will be resupplied in quantities equivalent to that forced out or relieved, for instance, from the first vessel so as to maintain the quantities of liquid in the several vessels at certain levels for effective drawing off or decantation through the pipes $r'$, $r^2$, $r^3$ and $r^4$, the quantity of liquid delivered from each vessel to the next preceding vessel containing liquid richer in sugar than the succeeding vessel being equivalent in quantity to that discharged as the richest in sugar from the first vessel. During the circulation of the liquid from the several vessels into others included in the apparatus, the pumps $c^5$ will insure a positive delivery of the liquid into the several feeders, and this circulation will continue until the feeding of material to be treated into the first vessel is stopped and a final discharge of the liquid rich in sugar and of the fully lixiviated solid matter is effected. The liquid is all discharged from the first vessel through the pipe $r'$ to any suitable point distant from the apparatus for further treatment, and under this condition the further treatment may be more expeditiously carried on in view of the fact that the liquid carrying the sugar is uniform as to its richness.

Instead of using the heaters $h$ as shown by Figs. 1 and 2, the heater $d$ as shown by Fig. 3 may be employed, and this heater is in the form of a steam heating means and whereby the vessel and its contents may be directly heated.

What is claimed is:

1. In an apparatus for continuously lixiviating solid matter such as sacchariferous plants and the like, the combination of a set of vessels arranged in series and containing liquid baths of a gradually enriched condition, each vessel being provided with a trough-shaped channel having an open feed hopper at the front end, means for feeding the matter to be lixiviated longitudinally through the vessel and at the rear end also having a conveyer adapted to take and separate the matter from the bath liquid of one vessel and transfer said matter to the feed hopper of the succeeding vessel, circulating and reheating means associated with each vessel whereby the liquid is supplied to the feed hopper of each vessel at the point where the matter to be treated enters the latter and is caused to flow along the vessel in the same direction as the matter fed therethrough, and overflow connections between the several vessels.

2. In an apparatus for continuously lixiviating solid matter, such as sacchariferous plants and the like, the combination of a set of vessels arranged in series and containing baths of a gradually enriched condition, each vessel comprising a trough-shaped channel having an open feed hopper at the front end, means for feeding the matter to be lixiviated longitudinally through the vessel and at the rear end also having a conveyer adapted to take and separate the matter from the liquid bath as well as to transfer the said matter to the feed hopper of the succeeding vessel, a pressing device interposed between the conveyer and the feed hopper of the vessels, circulating and reheating means associated with each vessel, and overflow connections between the vessels.

In witness whereof I have hereunto signed my name this 11th day of May 1905, in the presence of two subscribing witnesses.

CARL STEFFEN.

Witnesses.
  WOLDEMAR HAUPT,
  HENRY HASPER.